United States Patent [19]

Elrod et al.

[11] Patent Number: 4,770,060

[45] Date of Patent: Sep. 13, 1988

[54] APPARATUS AND METHOD FOR VARIABLE VALVE TIMING

[75] Inventors: Alvon C. Elrod, Clemson; Nelson, Michael T., Greenville, both of S.C.

[73] Assignee: Clemson University, Clemson, S.C.

[21] Appl. No.: 831,146

[22] Filed: Feb. 19, 1986

[51] Int. Cl.[4] ............ F16H 37/06

[52] U.S. Cl. ............ 74/665 L; 74/640; 74/568 R

[58] Field of Search ............ 74/640, 665 K, 438, 74/665 L, 568 R; 123/90.15, 90.17, 90.31

[56] References Cited

U.S. PATENT DOCUMENTS

| | | | |
|---|---|---|---|
| 733,220 | 7/1903 | Krebs | 123/90.17 |
| 862,448 | 8/1907 | Cornilleau | 123/90.17 |
| 1,527,456 | 2/1925 | Woydt et al. | 123/90.17 |
| 1,815,134 | 7/1931 | Weiner et al. | 123/90.6 |
| 2,057,354 | 10/1936 | Withers et al. | 123/90.17 |
| 2,888,837 | 6/1959 | Hellmann | 123/90.17 |
| 2,906,143 | 9/1959 | Musser | 74/640 |
| 2,959,065 | 11/1960 | Musser | 74/438 |
| 3,496,918 | 2/1970 | Finlay | 123/90.15 |
| 3,633,555 | 1/1972 | Raggi | 123/90.17 |
| 3,986,351 | 10/1976 | Woods et al. | 123/90.15 |
| 4,332,222 | 6/1982 | Papez | 123/90.17 |
| 4,357,917 | 11/1982 | Aoyama | 123/90.16 |
| 4,388,897 | 6/1983 | Rosa | 123/90.17 |
| 4,476,823 | 10/1984 | Williams | 123/90.15 |
| 4,494,495 | 1/1985 | Nakamura et al. | 123/90.15 |
| 4,524,639 | 6/1985 | Carlson | 74/640 |
| 4,561,390 | 12/1985 | Nakamura et al. | 123/90.17 X |
| 4,570,581 | 2/1986 | Titolo | 123/90.17 X |
| 4,572,118 | 2/1986 | Baguena | 123/90.16 |
| 4,577,598 | 3/1986 | Ma | 123/90.15 X |
| 4,583,501 | 4/1986 | Williams | 123/90.15 |
| 4,587,934 | 5/1986 | Moores | 123/90.18 |

FOREIGN PATENT DOCUMENTS

| | | |
|---|---|---|
| 704575 | 4/1941 | Fed. Rep. of Germany . |
| 727987 | 11/1942 | Fed. Rep. of Germany . |
| 1924114 | 11/1970 | Fed. Rep. of Germany . |
| 2921645 | 12/1980 | Fed. Rep. of Germany . |
| 3212663 | 10/1983 | Fed. Rep. of Germany . |
| 3234640 | 3/1984 | Fed. Rep. of Germany . |
| 517937 | 5/1921 | France . |
| 1109790 | 9/1955 | France . |
| 2066361 | 7/1981 | United Kingdom . |

OTHER PUBLICATIONS

Yamaguchi, J., "International Viepoints," *Automotive Engineering*, pp. 97-99, vol. 92, No. 1, Jan. 1984.

Stone et al., "Variable Valve Timing for IC Engines," *Automotive Engineer*, vol. 10, No. 4, pp. 54-58, Aug.-Sep. 1983.

Scott, D., "Variable Valve Timing has Electronic Control," *Automotive Engineering*, vol. 92, No. 5, pp. 86-87, May 1984.

"Cam Shaft Shifter Cuts Fuel Use," Machine Design, Feb. 6, 1986, p. 46.

*Primary Examiner*—Leslie A. Braun

*Assistant Examiner*—David Novais

*Attorney, Agent, or Firm*—Dority & Manning

[57] ABSTRACT

An apparatus for cyclically actuating an actuation member comprises a hollow shaft rotatable about an axis of rotation and defining therein a cam opening therethrough, an inner shaft rotatably carried within the hollow shaft, a cam member fixed to the hollow shaft adjacent the cam opening, a cam member fixed to the inner shaft and projecting through the cam opening of the hollow shaft, a variable transmission having a reference element connected to one of the shafts and an output element connected to the other of the shafts, and an input element; a pulley wheel connected to the shafts for rotating same about the axis, and an electric motor connected to the input element of the variable transmission for rotating same, the electric motor being controlled by an electronic control unit which can include one or more microprocessor units.

14 Claims, 5 Drawing Sheets

APPARATUS AND METHOD FOR VARIABLE VALVE TIMING

BACKGROUND OF THE INVENTION

The present invention relates to internal combustion engines and in particular to an apparatus and method for varying the valve timing pertaining to a combustion chamber thereof.

Improvements in power output, economy, and emissions are obtained by variable valve timing of spark-ignition engines, and numerous different variable valve timing mechanisms have been tried. Variable valve timing also provides benefits for diesel engines, including: improved starting, the use of a lower compression ratio, reduction in diesel "knock," the ability to use lower quality fuels, a raising and flattening of the torque curve, improved fuel consumption, reduced emissions, and better control of scavenging in turbocharged engines.

Improving the fuel consumption efficiency of an internal combustion engine can be accomplished by decreased friction, higher compression ratios, improved combustion, and reduction of an engine's pumping losses. The pumping losses, which are the negative work required by an engine to intake and exhaust gasses during operation, are a significant fraction of the losses which reduce the fuel consumption efficiency of the engine. In the case of a spark-ignition engine, these losses result primarily from the resistance associated with the flow of fresh air past the throttling valve before entering the individual combustion chambers of the engine. The throttle performs the necessary function of controlling the engine power output by varying the amount of air/fuel mixture available for consumption. Thus, any elimination of the throttle valve requires an alternative means of controlling the amount of air/fuel mixture inducted into the combustion chamber to support the required engine load.

A standard spark-ignition automobile engine operates the majority of the time at part throttle where pumping losses are greatest. The penalty in part-load performance of a conventional spark-ignition engine varies from 3.5% of the nominal mean-effective pressure at wide-open throttle to nearly 100% for a fully throttled idling engine. These performance penalties are attributed primarily to the throttling process. It is believed that running an engine at wide-open throttle throughdut its load-speed range would improve the average overall efficiency of the engine by about 20%.

U.S. Pat. No. 4,388,897 to Rosa, proposes a variable valve timing device comprising a camshaft wormed over part of its length and carrying a spittable cam assembly separable along the axis of rotation of the camshaft. However, in the Rosa device the control over the valve event is dependent upon the speed of the camshaft. Moreover, the degree of control over the valve event permitted by the Rosa device is limited by the sensitivity of the linkage that restrains axial movement of the camshaft. Furthermore, the axial shifting principle of the Rosa device renders it difficult to miniaturize to conserve space in the engine compartment.

OBJECTS AND SUMMARY OF THE INVENTION

It is a principal object of the present invention to provide an improved apparatus and method to cyclically actuate an actuation member.

A further object of the present invention is to provide an improved apparatus and method to cyclically actuate an actuation member while controllably varying the duration of time over which the actuation member is actuated in each cycle.

It also is an object of the present invention to provide an apparatus and method to reduce the pumping losses associated with the standard air-intake system for spark ignition engines.

Another object of the present invention is to provide an apparatus and method for controlling the amount of charge inducted to support the required engine load of spark ignition engines without the pumping losses associated with a standard, i.e., throttled, air intake system.

A further object of the present invention is to provide an apparatus and method for eliminating the pumping losses of a spark-ignition engine while maintaining the same useful output.

It also is an object of the present invention to provide an apparatus and method for controlling the induction of an air/fuel charge into the compression chamber of a spark-ignition engine by varying the valve timing applied to the intake valves of the compression chamber.

Another object of the present invention is to provide an improved camshaft design which will provide better performance over the entire operating range of the engine.

A further object of the present invention is to provide an apparatus and method for optimizing the engine characteristics pertaining to emissions, fuel economy, and performance at each load/speed point of the engine's operating range.

A further object of the present invention is to eliminate the throttle valve of a standard spark-ignition engine and the operating losses associated with same.

Still another object of the present invention is to provide an improved apparatus and method for inducting air into the compression chamber of a standard spark-ignition engine at atmospheric pressure.

Yet another object of the present invention is to provide an apparatus and method for controlling the scheduling of exhaust valve-timing events for a spark-ignition engine.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus of the present invention comprises a hollow shaft rotatable about an axis of rotation; an inner shaft rotatably carried within the hollow shaft; means for actuating the actuation member, the actuating means being carried by one of the shafts; means for linking the shafts for rotation about the axis without relative rotation between the shafts, the linking means being connected to the shafts; drive means connected to the shafts for rotating the shafts about the axis; and control means for imparting a controlled relative rotation between the shafts while the drive means is driving same, the control means being connected to the linking means.

The actuating means preferably comprises a matched pair of cam members, one mounted on each of the shafts for actuating an actuation member such as a cam follower. A cam opening is defined in the hollow shaft, and the cam member carried by the inner shaft projects through the cam opening.

The linking means preferably comprises a variable transmission having a reference element connected to one of the shafts, an output element connected to the other of the shafts, and an input element. The reference element preferably comprises either an internal gear, or a flexible external gear. The output element then preferably comprises the other gear, either internal or external, depending upon which one was chosen for the reference element. Preferably, the input element comprises an elliptical ball-bearing assembly. The flexible external gear member receives the elliptical ball-bearing assembly therein to deform and engage the external gear with the internal gear, thus non-rotatably linking the hollow shaft to the inner shaft so that they rotate in unison.

The control means preferably comprises an electric motor having an armature shaft connected to the elliptical ball-bearing assembly to rotate same upon operation of the motor. Rotation of the elliptical ballbearing assembly causes the splines of the external gear to engage the splines of the internal gear. This engagement results in creeping of one of the external and internal gears relative to the other because of a smaller number of splines over the circumference of one of the gears relative to the number of splines on the circumference of the other of the gears. The creeping of one gear relative to the other gear causes relative rotation between same, and ultimately relative rotation between the inner shaft and the hollow shaft because each shaft is connected to one of the external and internal gears. The electric motor can be actuated via a linkage with the accelerator pedal of an automobile.

In another embodiment, the control means further comprises an electronic control unit which controls operation of the electric motor. The electronic control unit can include one or more microprocessor units which receive engine operating parameters or operator supplied inputs. The electronic control unit controls the electric motor depending upon one or more operating conditions of the engine and/or operator supplied inputs.

Yet another embodiment of the apparatus of the present invention constitutes a hollow shaft rotatable about an axis of rotation; an inner shaft rotatably carried within the hollow shaft; and means for actuating an actuation member, the actuating means being carried by at least one of the shafts. Preferably, the hollow shaft defines a cam opening therethrough in a portion thereof. Moreover, the actuating means includes a cam fixed to the hollow shaft and a variable cam fixed to the inner shaft and projecting through the cam opening. Rotation of the inner shaft relative to the hollow shaft permits an angular separation between the fixed cam and the variable cam as the variable cam moves with rotation of the inner shaft.

Another alternative embodiment of the invention permits an additional element of control for actuating an actuation member and comprises a control means which includes a second variable transmission and a second electric motor. The second variable transmission has a second reference element, a second output element, and a second input element. Preferably, an electronic control unit controls the second electric motor and the first electric motor. The output shaft of the second electric motor is connected to the second input element. Moreover, the second reference element is connected to the drive means, and the second output element is connected to the hollow shaft. In this further alternative embodiment, actuation of the second electric motor causes the hollow shaft and the inner shaft to rotate in unison, but the rotation is relative to the rotation of the driving means. Thus, this further alternative embodiment of the present invention permits a change in the relative rotation of the shafts from the driving means. Activation of the first electric motor causes relative rotation between the hollow shaft and the inner shaft in much the same fashion as accomplished in the embodiment having only a single variable transmission The rotational control over the hollow shaft and the inner shaft of the present invention extends to any cam members carried thereon, such as a fixed cam member carried on the hollow shaft and a variable cam member carried on the inner shaft and projecting through the cam opening defined in the hollow shaft. Thus, it is possible using the apparatus of the present invention to change the rotation of both cams relative to the rotation of the drive means. It also is possible to advance the position of the variable cam member so that as the two shafts rotate, the variable cam member will engage an actuation member in advance of the fixed cam member. Similarly, it is possible to retard the rotation of the variable cam until it attains a desired retarded angular position relative to the fixed cam. In the retarded position, the variable cam will engage the actuation member later than engagement by the fixed cam member as the two cams rotate.

To further achieve the objects and in accordance with the purpose of the invention, as embodied and broadly described herein, there is provided a method of reducing pumping losses and improving brake specific fuel consumption for a spark ignition engine, the engine having a combustion chamber with a piston therein for varying the volume of same, an induction manifold disposed between the atmosphere and the combustion chamber, an intake valve disposed between the combustion chamber and the induction manifold, and a camshaft for actuating the intake valve. The method comprises: inducting a charge of fluid into the combustion chamber; holding the intake valve open during a portion of the compression stroke of the piston; expelling a portion of the inducted charge from the combustion chamber; preventing the expelled portion of the inducted charge from communicating with the atmosphere; and closing the intake valve during the remainder of the compression stroke and after the portion of the inducted charge is expelled.

Preferably, the expelled portion of the inducted charge is prevented from communicating with the atmosphere by the provision of a check valve disposed between the induction manifold and the atmosphere. The check valve permits fluid to flow from the atmosphere through the intake valve and into the combustion chamber during the induction stroke of the piston. However, the one-way structure of the check valve prevents the expelled portion of the inducted charge from passing through the check valve and communicating with the atmosphere.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Figure 1:
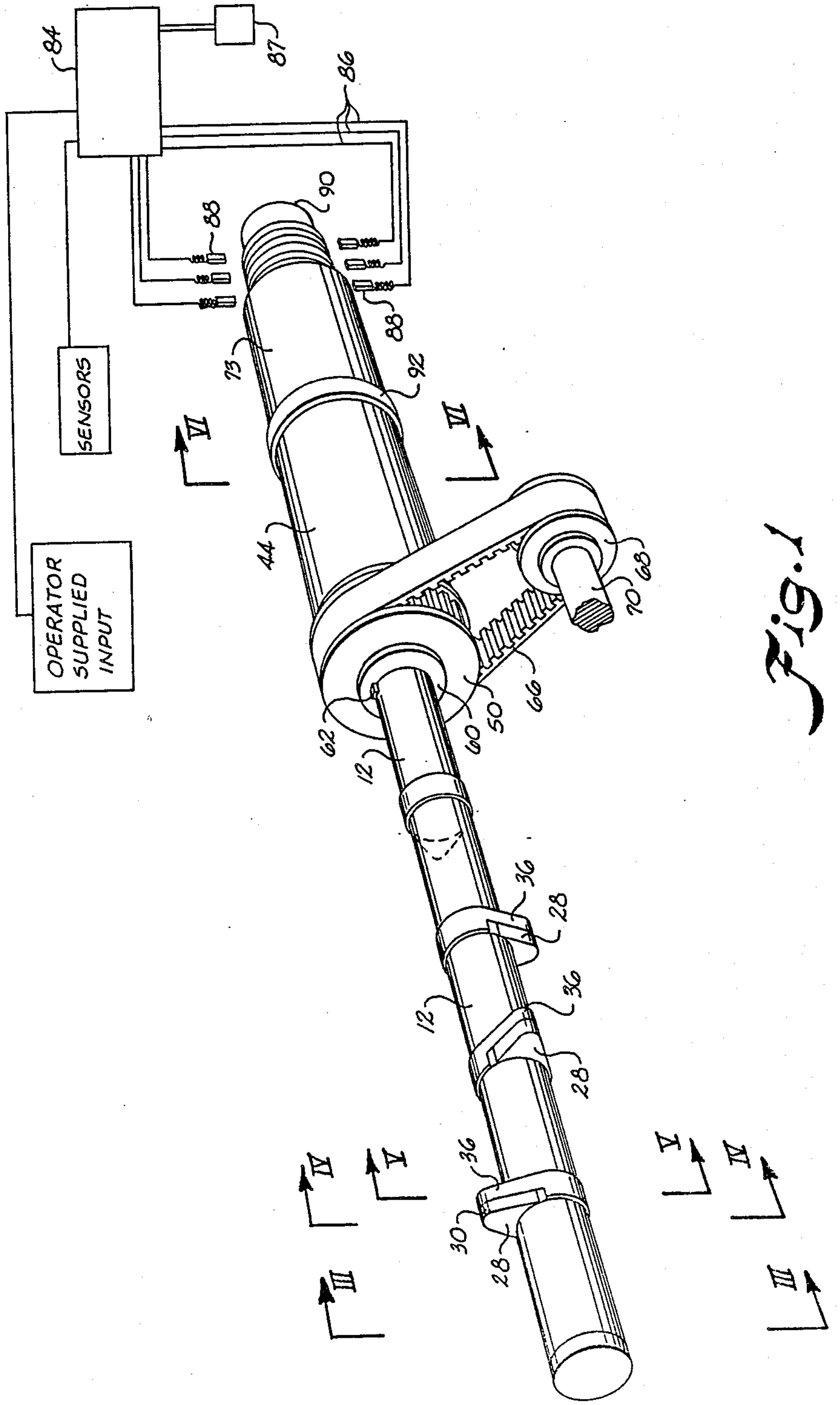
FIG. 1 is a perspective view of an embodiment of the apparatus of the present invention, with certain components represented schematically.

Reference will now be made in detail to the present preferred embodiments of the invention, examples of which are illustrated in the accompanying drawings.

The apparatus for cyclically actuating an actuation member comprises a hollow shaft which is rotatable about an axis of rotation. As embodied herein and shown for example in FIGS. 1–2, a hollow shaft 12 has a centrally located rotational axis 14. Shaft 12 preferably is formed as a hollow cylinder with the hollow interior having a circular cross-section. Hollow shaft 12 preferably is formed of metal or any other rigid material capable of withstanding the operating environment of shaft 12. For some applications, shaft 12 may be formed of a plastic or resinous material that is a poor conductor of electricity and magnetically inert.

The cyclically actuating apparatus of the present invention further comprises an inner shaft rotatably carried within the hollow shaft. As embodied herein and shown for example in FIGS. 2–6, an inner shaft 16 has a cross-sectional periphery shaped like a polygon, such as the hexagon shown in FIGS. 2–6. Inner shaft 16 preferably is formed of a rigid metallic material and preferably is carried concentrically about axis 14 within hollow shaft 12 via a plurality of bushings 18. However, shaft 16 could be carried eccentrically about axis 14 within shaft 12, but this embodiment is not illustrated in the drawings herein. Moreover, shaft 16 could have a partial or full circular cross-sectional profile in an embodiment assembled differently than the embodiment illustrated in the Figs. For example, bushings 18 could be eliminated and hollow shaft 12 could comprise two sections joined around a circular inner shaft carrying a plurality of cam members integrally formed thereon.

Each bushing 18 has a cross-sectional periphery shaped like a circle so that bushing 18 rotates concentrically about axis 14 within hollow shaft 12. Each bushing has an inner opening 20 extending along its entire length. Opening 20 is configured to nonrotatably receive the exterior profile of inner shaft 16. Thus, bushings 18 serve to permit inner shaft 16 to be carried within hollow shaft 12 and carried rotatably about the same axis of rotation 14. Bushings 18 preferably are formed of a rigid material such as brass or another material capable of withstanding the operating environment of shafts 12, 16.

A circular profile for opening 20 suffices for the hexagonal shaped profile of inner shaft 16 depicted in the drawings. The circular shaped profile is likely to wear faster than the profile which exactly matches that of the inner shaft. However, the circular shaped profile of bushing opening 20 is the easiest to manufacture.

The apparatus for cyclically actuating an actuation member according to the present invention further comprises means for actuating the actuation member. The actuating means is carried by one of the shafts. As embodied herein and shown for example in FIGS. 1–4, the actuating means preferably comprises a variable cam member 28. Variable cam member 28 has a lobe portion 30 for engaging an actuation member. An inner shaft opening 32 is formed at the opposite end of cam 28 and is configured for non-rotatably receiving therethrough, inner shaft 16. Cam 28 is formed of a metallic or other material suitable for the operating environment of cam 28. As illustrated in the preferred embodiment of the invention of FIG. 2, shaft 12 defines a cam opening 34 which is cut completely through the thickness of the wall which defines hollow shaft 12.

Figure 2:
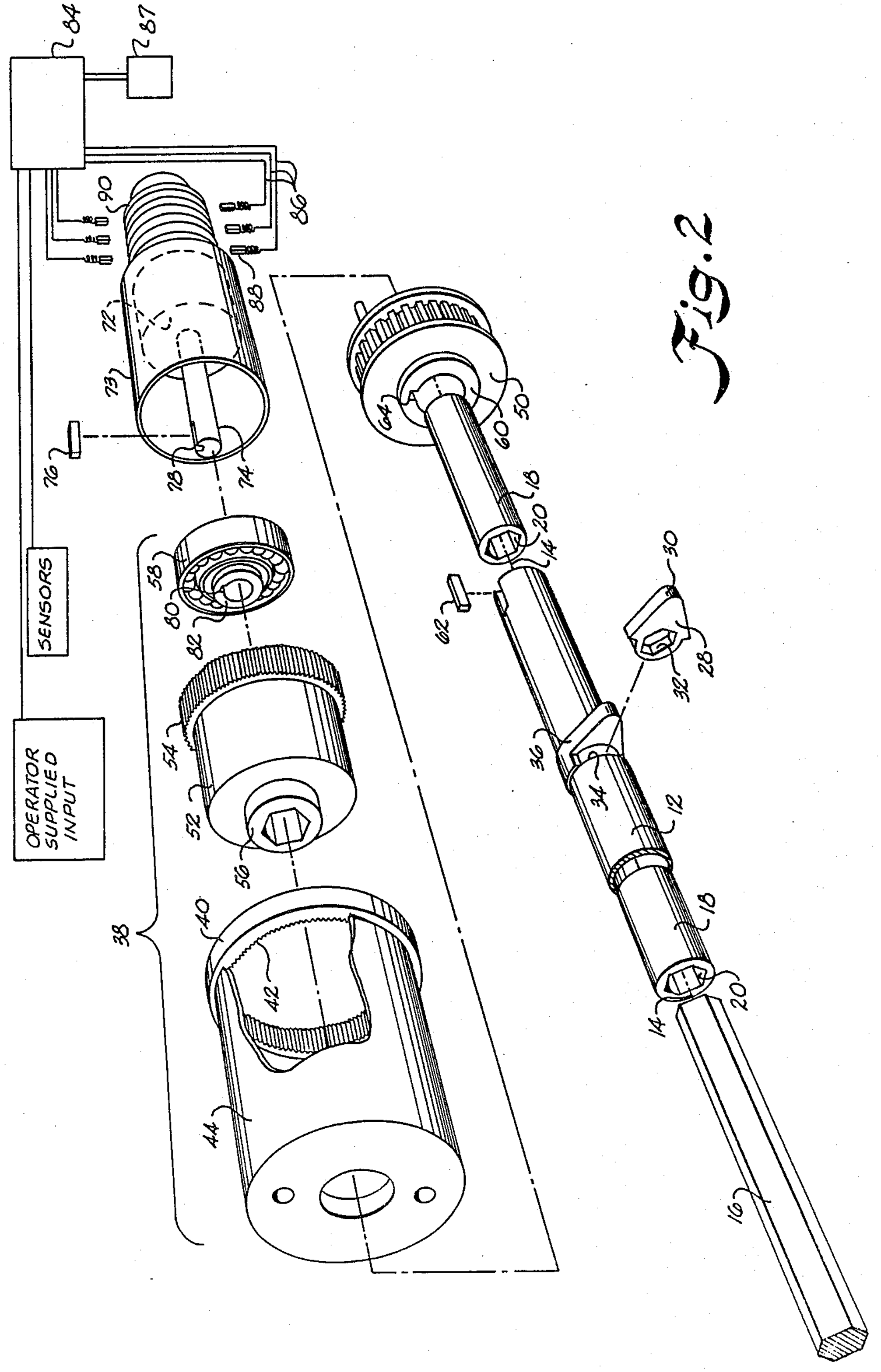
FIG. 2 is an exploded perspective view of the embodiment of FIG. 1.

In the embodiment of FIG. 2, the assembly of the shaft and variable cam components can be effected as follows: a bushing 18 is inserted into hollow shaft 12 past cam opening 34. A variable cam member 28 is then inserted through cam opening 34 of hollow shaft 12. Then another bushing 18 is inserted into hollow shaft 12 until it meets variable cam member 28. Inner shaft 16 is inserted through bushing opening 20 and through inner shaft opening 32 of variable cam member 28, so that rotation of inner shaft 16 about axis 14 rotates inner shaft 16 and cam 28 in unison. Thus, inner shaft 16 non-rotatably carries variable cam member 28

Figure 4:
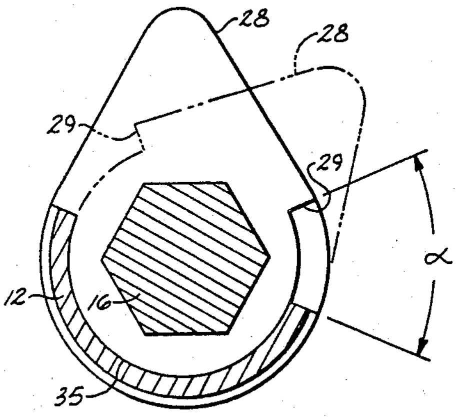
FIG. 4 is a cross-section taken along the line IV—IV of FIG. 1.
Figure 5:
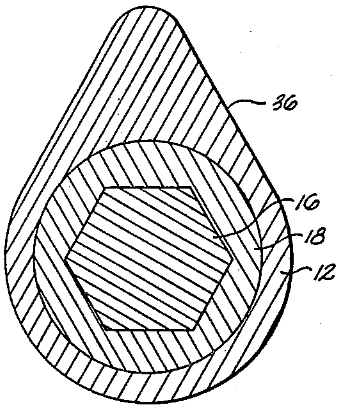
FIG. 5 is a cross-section taken along the line V—V of FIG. 1.

As shown in FIG. 4, variable cam member 28 has a pair of ears 29 which engage a portion of cam opening 34 defined in hollow shaft 12. Variable cam 28 can be adjusted over an angular range of rotation $\alpha$ in the embodiment shown in FIG. 4. This range of rotation is limited by the size of cam opening 34 and the relative size of variable cam member 28. The position of ears 29 also affects the amount of rotational motion to be afforded variable cam member 28 within cam opening 34 of hollow shaft 12. In the embodiment shown in FIG. 4, the portion of variable cam member 28 having shaft opening 32 has a peripheral riding surface 35 which engages and rotates relative to the interior surface of hollow shaft 12.

Figure 3:
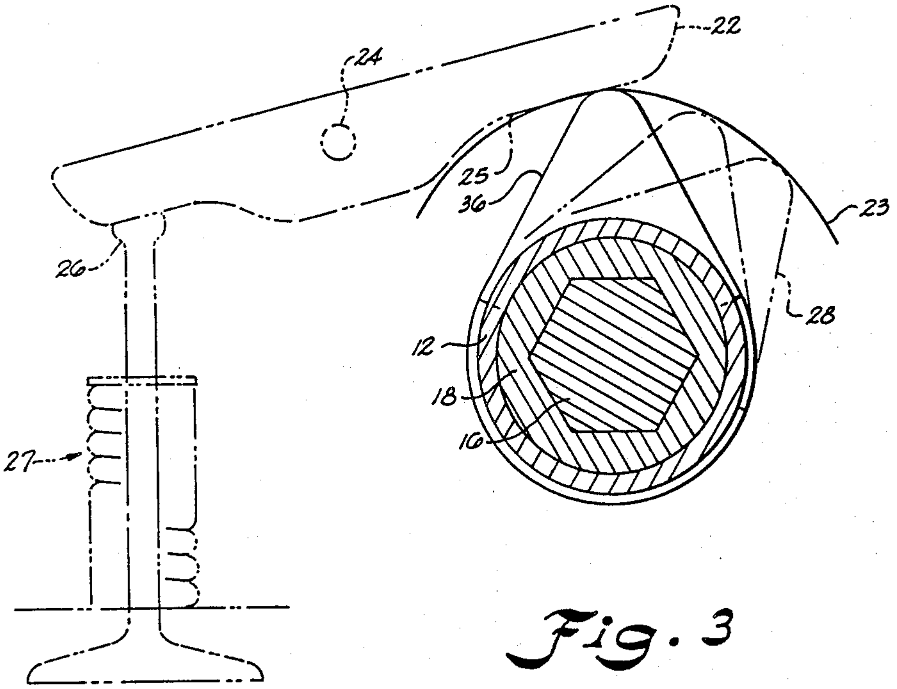
FIG. 3 is a cross-section taken along the line III—III of FIG. 1.

As embodied herein and shown for example in FIG. 3, the actuation member preferably comprises a cam follower 22, which is indicated in phantom as rotating about a pivoting shaft 24 with one end engaging a valve tappet 26 of an internal combustion engine valve 27.

In a preferred embodiment of the present invention, the actuating means further comprises a fixed cam member 36, as illustrated for example in FIGS. 1, 2, 3, and 5. Fixed cam member 36 can be formed of the same or similar material as variable cam member 28 and has a matching or complimentary profile, as desired for the particular application, at the lobe portion where the actuating means engages and actuates an actuation member such as cam follower 22. Fixed cam member 36 can be formed integrally with hollow shaft 12 or can be a separate member fixed to the exterior surface of hollow shaft 12 and carried thereby so that fixed cam member 36 does not rotate relative to hollow shaft 12. Moreover, in the embodiment shown in FIGS. 1 and 2, fixed cam member 36 and variable cam member 28 are arranged adjacent each other and comprise a single actuating means. Each cam member 28, 36 is one half the width of a conventional cam member carried by a conventional camshaft. However, cam opening 34 can be located apart from where fixed cam member 36 is attached to hollow shaft 12, as desired by the particular application.

Various combinations of fixed and variable cam members and relative positionings thereof along hollow shaft 12 and inner shaft 16 are contemplated. The specific number and arrangement of same is controlled primarily by the particular application desired. For example, as shown in FIG. 1, a plurality of fixed and variable cam members can be provided. Moreover, one or more variable cam members 28 can be provided without a fixed cam member mate. Furthermore, as few as a single variable cam member 28 can be provided on a single camshaft comprised of hollow shaft 12 and inner shaft 16.

Preferably, the cam members are designed to provide profiles that permit a smooth transition of the actuation of cam follower 22 from one member to the other. In this way, during a large relative adjustment of the cam members, which, for example, is necessary to permit a late intake valve closing, the fixed cam member will not allow the valve to begin closing before contact is made with the variable cam member. Preferably the actuation member, such as cam follower 22, will be contoured to accept the motion path of the actuating means so that a smooth transition occurs. For example, as shown in FIG. 3, variable cam 28 moves in a generally circular path 23, and cam follower 22 is configured with a generally circular acruate surface 25 for accepting variable cam 28 as cam 28 moves in its generally circular path.

In a further alternative embodiment of the present invention, the actuating means can comprise a magnetic element (not shown) carried on inner shaft 16. In this case, which is not illustrated in the drawings, there is no need for any cam opening 34 in hollow shaft 12. Hollow shaft 12 is then preferably fabricated of a material conducive to the actuation of an actuation member by the magnetic element carried on inner shaft 16. Moreover, the magnetic element carried on inner shaft 16 can be used in conjunction with another magnetic element carried on hollow shaft 12 if desired by the particular application. Furthermore, a plurality of magnetic elements can be arranged as desired on shafts 12, 16, as is the case with fixed and variable cams 36, 28.

In accordance with the present invention, means are provided for linking the shafts for rotation about the axis without relative rotation between the shafts. The linking means is connected to the shafts. As embodied herein and shown for example in FIG. 2, the linking means preferably comprises a variable transmission indicated generally by the numeral 38 and comprising a reference element, an output element, and an input element. One of shafts 12, 16 is connected to the reference element of the variable transmission, and the other of shafts 12, 16 is connected to the output element of the variable transmission. Preferably, the drive means (described hereinafter) is connected to whichever shaft in this embodiment is connected to the reference element of the variable transmission.

Preferably, the variable transmission comprises a Harmonic Drive brand variable transmission gear mechanism such as described in U.S. Pat. No. 2,906,143, entitled, "Strain Wave Gearing," which is hereby incorporated herein by reference. The reference element of the embodiment of the variable transmission depicted in FIG. 2 comprises a rigid circular spline 40 having a rigid internal gear 42. This reference element is rigidly attached to hollow shaft 12 via mechanical connections, including a rigid cylindrical member 44 and a pulley wheel 50, which has an opening at the center thereof to permit passage therethrough, of inner shaft 16. One end of hollow shaft 12 is rigidly connected to pulley wheel 50. Thus, hollow shaft 12 rotates as one in this embodiment with the reference element of the variable transmission.

Furthermore, the output element of the preferred embodiment of the variable transmission comprises a cylindrical cup-shaped member 52 having a non-rigid, external gear 54. On the end of cup-shaped member 52 opposite non-rigid, external gear 54, there is an attachment flange 56 for non-rotatably receiving and securing therein, one end of inner shaft 16. Thus, inner shaft 16 rotates in unison with cup-shaped member 52, and external gear 54.

Figure 6:
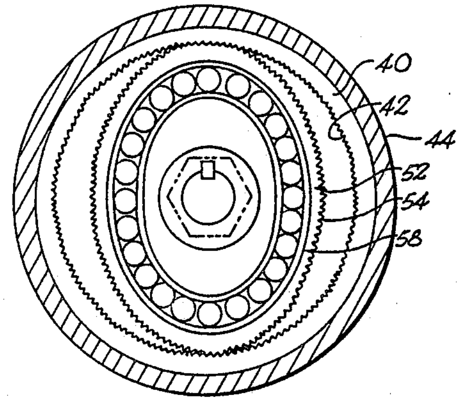
FIG. 6 is a cross-section taken along the line VI—VI of FIG. 1.

In the preferred embodiment of the variable transmission depicted in FIG. 2, the input element comprises an elliptical ball-bearing assembly 58 received within cup-shaped member 52 in the vicinity of non-rigid, external gear 54. As shown in FIG. 6, elliptical ballbearing assembly 58 deforms non-rigid external gear 54 so that gear 54 meshes with internal gear 42 of rigid circular spline 40 in the vicinity of the major axis of elliptical ball-bearing assembly 58. Thus, cylindrical cup-shaped member 52 and external gear 54 are linked with rigid circular spline 40 and internal gear 42 so that the linked components rotate in unison. Since inner shaft 16 is rigidly connected to external gear 54 via cup-shaped member 52, and hollow shaft 12 is rigidly connected to internal gear 42 via cylindrical member 44, etc., as explained above, the variable transmission links shafts 12, 16 for rotation about axis 14 without relative rotation between shafts 12, 16.

External gear 54 has two fewer splines around its circumference than the number of splines forming the complete circumference of internal gear 42, and this differential performs a significant function in achieving relative rotation between shafts 12, 16, as hereinafter explained.

In alternative embodiments of the invention, the linking means may comprise other types of variable transmissions which comprise a reference element, an output element, and an input element. Examples, which are not shown in the Figs., include a slip-fit brake, a clutch, a planetary gear set, or an accelerator linkage assembly. Another example not shown in the Figs. is another Harmonic Drive brand variable transmission gear mechanism comprising pancake gear components. This pancake gear component mechanism is described in U.S. Pat. No. 2,959,065, entitled, "Spline and Rotary Table," which is hereby incorporated herein by reference. This pancake gear mechanism is compact and especially suitable for embodiments requiring a minimal use of space.

The apparatus for cyclically actuating an actuation member further comprises drive means connected to the shafts for rotating the shafts about the rotational axis. As embodied herein and shown for example in FIG. 1, the drive means preferably comprises pulley wheel 50, non-rotatably secured to hollow shaft 12 via a locking flange 60 and a spline lock member 62 inserted into a spline keyway 64 defined in locking flange 60. The drive means of this embodiment further comprises a belt 66 which is rotated by a crankshaft pulley wheel 68 connected to a crankshaft 70 of an engine (not shown). The engine rotates crankshaft 70 which drives shafts 12, 16 via belt 66 and pulley wheels 50, 68. The relative rotational cycles of crankshaft 70 and shafts 12, 16 have a relationship which depends upon the size of pulley wheels 62, 68.

In further accordance with the present invention, control means are provided for imparting a controlled relative rotation between the shafts while the drive means is driving same. The control means is connected to the linking means. As embodied herein and shown for example in FIGS. 1 and 2, the control means preferably comprises an electric motor 72 having an armature shaft 74. Electric motor 72 is non-rotatably mounted within a housing 73 which is in turn non-rotatably connected to rigid cylindrical member 44 via a connecting ring 92 so that electric motor 72 rotates in unison with shafts 12, 16.

Elliptical ball-bearing assembly 58 is connected in a non-rotatable fashion to the free end of armature shaft 74. For example, as shown in FIG. 2, a spline-lock member 76 is received partially within a spline-keyway 78 formed in the free end of armature shaft 74 and partially within a spline-keyway 80 formed within a locking flange 82 of ball-bearing assembly 58. As noted above, external gear 54, internal gear 42, and elliptical ball-bearing assembly 58, respectively comprise the output, reference and input elements of the particular variable transmission embodiment depicted in FIGS. 1 and 2.

Motor 72 rotates armature shaft 74 and elliptical ball-bearing assembly 58 connected thereto. During rotation, elliptical assembly 58 deforms cup-shaped member 52 to accommodate the major axis of elliptical assembly 58. As elliptical assembly 58 rotates, the splines of external gear 54 engage the splines of internal gear 42 in the vicinity of the major axis of elliptical assembly 58. However, two fewer splines comprise external gear 54 than comprise internal gear 42. Thus, with each complete revolution of elliptical assembly 58, there is less than a one-to-one correspondence between the splines of the external gear and the splines of the internal gear. External gear 54 indexes two splines around internal gear 42 for each revolution of elliptical assembly 58. This results in a net translation between the two gears in one direction or another, depending upon the direction of rotation of elliptical assembly 58. The relative rotation results because the reduced number of splines on the external gear means that two of the external gear splines will twice engage splines of the internal gear during each complete rotation of elliptical assembly 58. It is this relative rotation between gears 42, 54 that permits relative rotation between the two shafts 12, 16, which are separately connected to the two gears.

In an alternative embodiment of the present invention, the control means further comprises an electronic control unit 84. Actuation of electric motor 72 is controlled via appropriate electrical leads 86 connecting a power source 87 via unit 84 with contacting brushes 88, which electrically engage a slip ring assembly 90 of electric motor 72. Electronic control unit 84 can contain one or more microprocessor units which can be preprogrammed to process input information constituting operating parameters of an engine which includes an actuation member such as cam follower 22. These microprocessor units also can be programmed to receive operator supplied inputs. This electronic control unit 84 can be preprogrammed to control motor 72 based upon the operating status of the engine, as determined from the operating inputs received by unit 84, or based upon the operator supplied inputs received by unit 84. Moreover, the engine in question can be the same engine that provides the driving force to rotate crankshaft 70.

Operation of the embodiment of the apparatus of the present invention depicted in the Figs. now will be explained. This explanation assumes that crankshaft 70 is the crankshaft of an internal combustion engine, and cam follower 22 activates an intake valve of a combustion chamber of the engine which drives crankshaft 70. However, cam follower 22 could just as easily activate an exhaust valve of the engine's combustion chamber.

Pulley wheel 50 is rotated by crankshaft 70 via belt 66 at a predetermined number of cycles, i.e., complete revolutions, per second. The number of cycles per second is dependent upon the engine speed and the size ratio between pulley wheel 50 and crankshaft pulley wheel 68. Pulley wheel 50 is rigidly attached to cylindrical member 44 and to hollow shaft 12. Cylindrical member 44 carries internal gear 42. Inner shaft 16 is rigidly attached to cup-shaped member 52 which carries external gear 54. Cup-shaped member 52 is disposed relative to cylindrical member 44 so that external gear 54 intermeshes with internal gear 42 along the major axis of elliptical ball-bearing assembly 58. Thus, elliptical ball-bearing assembly 58 is disposed within cup-shaped member 52 and deforms same to cause external gear 54 to engage internal gear 42. The engagement of internal gear 42 with external gear 54 links cylindrical member 44 with cup-shaped member 52 so that the two rotate in unison, and accordingly hollow shaft 12 rotates in unison with inner shaft 16.

Motor housing 73 is rigidly attached to cylindrical member 44 so that these two members also rotate in unison. Electric motor 72 is rigidly attached to motor housing 73 so that electric motor 72 also rotates in unison with each of motor housing 73, cylindrical member 44, and shafts 12, 16. The free end of armature shaft 74 is rigidly attached to elliptical ball-bearing assembly 58. When electric motor 72 is inoperative, armature shaft 74 of motor 72 also rotates in unison with shafts 12, 16. When motor 72 is operated, armature 74 rotates ball-bearing assembly 58 relative to cup-shaped member 52 and cylindrical member 44. Rotation of ball-bearing assembly 58 relative to internal and external gears 42, 54, respectively, causes relative rotation between internal gear 42 and external gear 54. This relative rotation is caused by the larger number of splines constituting internal gear 42 relative to the number of splines in external gear 54, as explained above. The relative rotation between the two gears as elliptical ball-bearing member 58 is rotated relative to the two gears causes relative rotation between shafts 12 and 16, which are separately connected to one of the two gears. Thus, operation of electric motor 72 causes relative rotation between shafts 12, 16 while the engine is driving shafts 12, 16 via pulley wheel 50. The amount of relative rotation is controlled by the number of rotations of armature shaft 74 of electric motor 72. Moreover, reversing electric motor 72 causes relative rotation between shafts 12, 16 in the opposite direction to restore same to their original relative rotational orientation.

The operation of electric motor 72 can be controlled further by electronic control unit 84. Moreover, sensors of engine operating parameters can provide inputs to one or more microprocessor units of electronic control unit 84. Operator supplied inputs, such as depressing an accelerator pedal, also can be provided to one or more microprocessors of electronic control unit 84. The desired inputs can be used according to a predetermined microprocessor program, to control electric motor 72 according to the operating status of the engine as indicated by the sensors of various operating parameters like engine speed, emissions, etc. For example, at low engine speeds of a standard spark ignition engine lacking a throttle, one or more microprocessor units of control unit 84 can control electric motor 72 with operator supplied inputs, to cause relative rotation between shafts 12 and 16 that would angularly separate a splitable cam and accordingly increase the duration over which an intake valve in the combustion chamber of the engine remained open during the compression stroke of the piston. This of course would have the effect of eliminating pumping losses associated with throttled engine performance.

Figure 7:
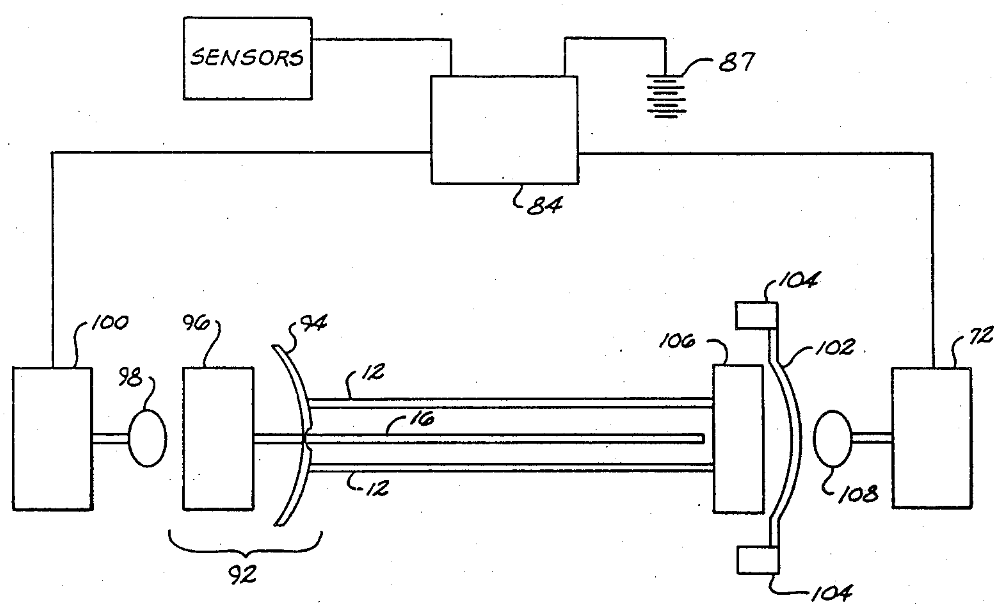
FIG. 7 is a schematic representation of an embodiment of the invention.

In another alternative embodiment of the present invention, the control means comprises two variable transmissions connected to the hollow shaft and the inner shaft to permit an additional degree of flexibility in causing relative rotation between the two shafts. As embodied herein and shown schematically for example in FIG. 7, a first variable transmission 92 has a first reference element 94, a first output element 96, and a first input element 98. Accordingly, in the embodiment shown in FIG. 7, first reference element 94 is connected to hollow shaft 12; and first output element 96 is connected to inner shaft 16. A first electric motor 100 is connected to first input element 98 to actuate same. A second variable transmission has a second reference element 102 connected to a drive means 104, a second output element 106 connected to hollow shaft 12, and a second input element 108 connected to electric motor 72. Electronic control unit 84 is connected to electric motors 72, 100, to control same.

Assuming that the first and second variable transmissions comprise the input, output, and reference elements of the variable transmission embodiment shown in FIG. 2, this alternative embodiment of the present invention operates as follows. Rotation of drive means 104 rotates hollow shaft 12 in unison with inner shaft 16. Activation of second input element 108 by electric motor 72 causes hollow shaft 12 and inner shaft 16 to rotate in unison. However, hollow shaft 12 and inner shaft 16 rotate relative to second reference element 102 and the drive means connected thereto. Thus, the entire relative timing of shafts 12, 16 can be changed relative to the original timing determined by rotation of the drive means. Moreover, if first input element 98 is rotated, then hollow shaft 12 rotates relative to inner shaft 16, thus permitting relative movement between any actuating elements carried by these respective shafts. These relative movements between the shafts and the respective cam members carried thereby, can be reversed relative to the direction of rotation of the drive means. Reversal is accomplished by rotating first input element in the opposite direction.

In accordance with the present invention, a method is provided for reducing pumping losses and improving brake specific fuel consumption for an internal combustion engine. The engine has a combustion chamber with a piston therein for varying the volume of the combustion chamber. An induction manifold is disposed between the atmosphere and the combustion chamber. An intake valve is disposed between the combustion chamber and the induction manifold. A camshaft for actuating the intake valve comprises a further component of the internal combustion engine.

Figure 8:
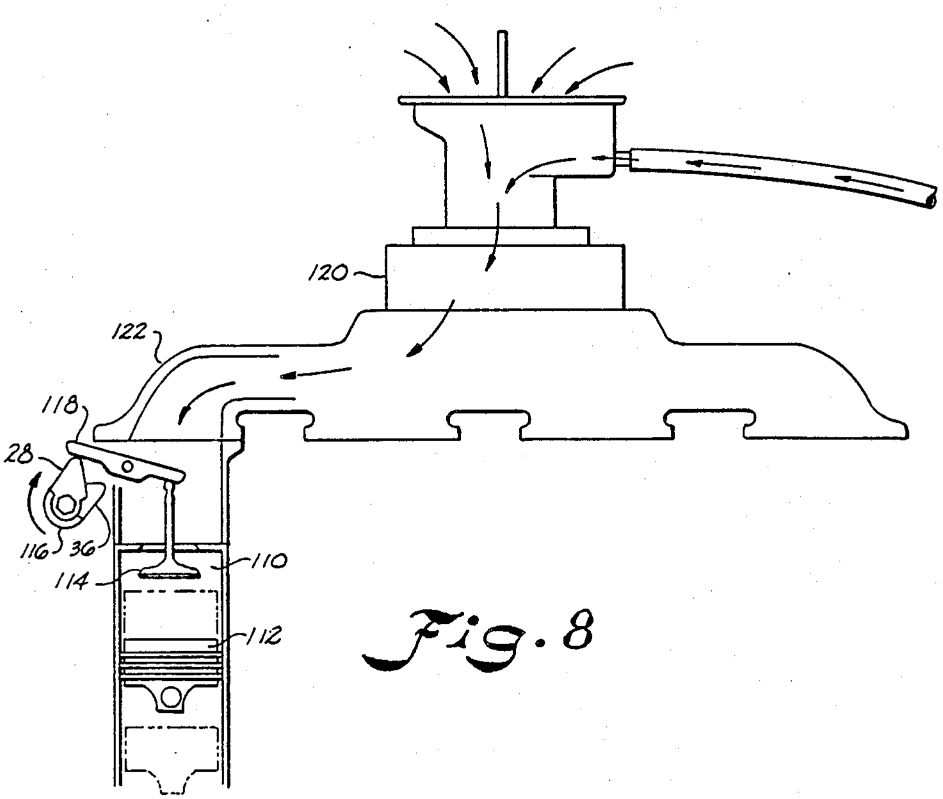
FIG. 8 is a schematic representation of an embodiment of the method of the present invention.

The method of the present invention comprises inducting a charge of fluid into the combustion chamber. As embodied herein and shown schematically in FIG. 8, a charge of fluid is inducted into a combustion chamber 110 as a piston 112 therein moves towards bottom dead center in its stroke (indicated in phantom). In a diesel engine, the charge of fluid comprises only air, while fuel and air comprise the charge of fluid in a spark-ignition engine.

In further accordance with the present invention, the intake valve is held open during a portion of the compression stroke of the piston. As embodied herein and shown for example in FIG. 8, the step of holding an intake valve 114 open can be accomplished by adjusting the cams of a camshaft 116 formed in accordance with the apparatus for actuating an actuation member of the present invention. In the embodiment of the apparatus of the present invention depicted in FIGS. 1–6, the variable cam member can be rotated relative to the fixed cam member in a direction opposite to the direction of rotation of the camshaft formed by shafts 12, 16. This relative adjustment of the cam members serves to extend the portion of the rotational cycle of the camshaft during which the cams are actuating a cam follower, such as a rocker arm 118, which is connected to intake valve 114, as shown in FIG. 6.

In further accordance with the present invention, a portion of the inducted charge is expelled from the combustion chamber. As embodied herein, the expulsion of a portion of the inducted charge is accomplished by the step of holding the intake valve open during a portion of the compression stroke of the piston. Since the intake valve is held open, the initial portion of the compression stroke forces a portion of the inducted charge from the combustion chamber out through the intake valve. The amount of charge expelled can be controlled by the time the valve is held open during the stroke. This time depends on the angular displacement effected between the fixed and variable cam members.

In yet further accordance with the present invention, the expelled portion of the inducted charge is prevented from communicating with the atmosphere. As embodied herein and shown for example in FIG. 8, the expelled portion of the inducted charge is prevented from communicating with the atmosphere by the provision of a check valve 120. The check valve is disposed between an induction manifold 122 and the atmosphere and permits flow only in the direction from the atmosphere into the induction manifold. Preferably, a reed valve is provided as the check valve in the preferred embodiment of the present invention.

In a diesel engine, the expelled air provides a supercharging effect. In a spark ignition engine, preventing the expelled air and fuel charge from communicating with the atmosphere, conserves fuel in addition to providing a supercharging effect.

In further accordance with the present invention, the intake valve is closed during the remainder of the compression stroke and after the portion of the inducted charge is expelled. As embodied herein and again referring to FIG. 8, as the variable cam ceases to contact valve rocker arm 118 of the intake valve, the intake valve closes under the influence of a biasing device (not shown), and the remainder of the compression stroke of the piston (shown in phantom) ceases to expel any of the inducted charge from the combustion chamber.

The brake specific fuel consumption defines an engine operating parameter that measures the mass rate of flow of fuel into an engine per unit of horsepower produced by the engine. It is contemplated that the method and apparatus of the present invention can provide improvements in brake specific fuel consumption. These improvements should be greatest at low speeds because at low speeds the pumping losses associated with throttled operation are the highest for a conventional camshaft arrangement.

Diesel engines require high compression ratios to facilitate their cold starting capability. However, optimum brake specific fuel consumption requires somewhat lower compression ratios than required for cold starting. The apparatus and method of the present invention facilitate closing the intake valves later in the compression stroke of the piston to allow the initiation of the compression process to be delayed. The effect of maintaining the valves in the open position longer is to shorten the effective compression stroke and thereby reduce the compression ratio. Thus, the apparatus and method of the present invention permit compression ratios to be optimized to provide a high compression ratio for cold starting a diesel engine and a lower compression ratio for better fuel economy of the diesel engine after it warms up. The invention also provides for control of the engine's variable compression ratio for any desirable operating condition.

The present invention permits variation in the intake valve opening and closing times of any combustion engine to optimize that engine's performance for all engine speeds and loads. In a further alternative embodiment of the present invention, a conventional (one piece) camshaft can be substituted for the variable camshaft, to change the timing for the conventional camshaft. In such an arrangement, all valve movements would occurearlier or later relative to the crankshaft operation. Such uniform movements are useful in some applications.

The apparatus and method of the present invention also are applicable to control the scheduling of exhaust valve timing events of an internal combustion engine.

It will be apparent to those skilled in the art that various modifications and variations can be made in the apparatus and method of the present invention without departing from the scope or spirit of the invention. For example, the invention can be applied to achieve the advantages afforded by variable valve timing described above. Thus, it is intended that the present invention cover the modifications and variation of this invention provided they come within the scope of the appended claims and their equivalents.

What is claimed is:

1. An apparatus for cyclically actuating an actuation member, the apparatus comprising:

a hollow shaft rotatable about an axis of rotation;

an inner shaft rotatably carried within said hollow shaft;

means for actuating the actuation member, said actuating means being carried by at least one of said shafts for moving circumferentially about said axis and for causing actuation of the actuation member;

means for linking said shafts for rotation about said axis without relative rotation between said shafts, said linking means being connected to said shafts and having an input element being rotatable about said axis;

drive means connected to said shafts for rotating said shafts about said axis in an actuating cycle timed to said drive means; and control means for imparting a controlled relative rotation between said shafts and causing thereby a change in the time of actuation of the actuation member ranging from earlier in the actuating cycle to later in the actuating cycle while said drive means is rotating said shafts, said control means having an output member being connected to said input element of said linking means, said output member rotating said input element relative to at least one of said shafts and about said axis and only during controlled relative rotation between said shafts, said controlled relative rotation between said shafts causing movement of said actuating means circumferentially about said axis.

2. An apparatus as in claim 1, wherein:

said linking means comprises a variable transmission having a reference element connected to one of said shafts, an output element connected to the other of said shafts, and an input element.

3. An apparatus as in claim 2, wherein:

said control means comprises an electric motor having a rotatable output member connected to said input element of said variable transmission.

4. An apparatus as in claim 2, wherein:

said reference element and said drive means are connected to said same one of said shafts.

5. An apparatus as in claim 3, wherein:

said control means further comprises an electronic control unit connected to said motor for controlling same.

6. An apparatus as in claim 5, wherein:

said electronic control unit receives operating information pertaining to an engine, said engine including the actuation member.

7. An apparatus as in claim 5, wherein:

said reference element is connected to said hollow shaft and said output element is connected to said inner shaft.

8. An apparatus as in claim 7, wherein:

said control means comprises a second variable transmission having a second reference element, a second output element, and a second input element, said second reference element being connected to said drive means and said second output element being connected to said hollow shaft.

9. An apparatus as in claim 8, further comprising:

a second electric motor connected to said second input element for activating same; and wherein said electronic control unit is connected to said second motor for controlling same.

10. An apparatus as in claim 8, wherein:

said hollow shaft has at least one cam opening therethrough; and said actuating means includes at least one splittable cam comprising at least two cam members, one of said cam members being carried by said hollow shaft adjacent said cam opening and a second of said cam members being carried by said inner shaft and projecting through said cam opening in said hollow shaft so that both said cam members are disposed adjacent each other and in position to actuate the actuation member during rotation of said shafts about said axis of rotation.

11. An apparatus as in claim 1, wherein:

said hollow shaft defines a cam opening therethrough in a portion thereof; and said actuating means comprises a cam fixed to said hollow shaft and a variable cam fixed to said inner shaft and projecting through said cam opening.

12. An apparatus as in claim 1, further comprising:

an elongated bushing having a peripheral cross-section defining a circle and further defining an opening at the central region thereof along the entire length thereof;

wherein said hollow shaft has an inner diameter cross-section defining a circle approximately equal to the outer diameter of the cross-section of said bushing; and wherein said inner shaft is non-rotatably received in said opening in the central region of said bushing.

13. An apparatus for cyclically actuating an actuation member, the apparatus comprising:

a hollow shaft rotatable about an axis of rotation;

an inner shaft rotatably carried within said hollow shaft;

means for actuating the actuation member, said actuating means being carried by at least one of said shafts;

a variable transmission connected to both of said shafts and linking said shafts for rotation about said axis without relative rotation between said shafts, said transmission having a non-rigid cylindrical external gear and an elliptical ball bearing assembly maintaining contact with the interior of said gear at both ends of the major axis of said assembly;

drive means connected to said shafts for rotating said shafts about said axis; and control means for imparting a controlled relative rotation between said shafts while said drive means is driving same, said control means being connected to said elliptical ball bearing assembly to rotate said assembly when imparting said controlled relative rotation between said shafts.

14. An apparatus for cyclically actuating a plurality of actuation members, the apparatus comprising:

a hollow shaft rotatable about an axis of rotation;

an inner shaft rotatably carried within said hollow shaft;

a plurality of means for actuating a respective plurality of actuation members, each said actuating means being carried by at least one of said shafts, each said actuating means being capable of actuating a respective actuation member;

means for linking said shafts for rotation about said axis without relative rotation between said shafts, said linking means being connected to said shafts and having an input element rotatable about said axis;

drive means connected to said shafts for rotating said shafts about said axis; and control means for imparting a controlled relative rotation between said shafts and causing thereby a change in the time of actuation of each actuation member ranging from earlier in the actuating cycle to later in the actuating cycle while said drive means is rotating said shafts, said control means having a rotatable output member being connected to said rotatable input element of said linking means, said output member rotating said input element relative to at least one of said shafts and about said axis and only during controlled relative rotation between said shafts, said controlled relative rotation between said shafts causing movement of each said actuating means circumferentially about said axis.

* * * * *